US012066582B2

(12) United States Patent
Nishimoto et al.

(10) Patent No.: US 12,066,582 B2
(45) Date of Patent: Aug. 20, 2024

(54) SIGNAL DETECTION DEVICE, MEASUREMENT DEVICE, AND MASS SPECTROMETER

(71) Applicant: HITACHI HIGH-TECH CORPORATION, Tokyo (JP)

(72) Inventors: Takuma Nishimoto, Tokyo (JP); Isao Furuya, Tokyo (JP); Suguru Kondo, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 18/290,019

(22) PCT Filed: Jun. 20, 2022

(86) PCT No.: PCT/JP2022/024621
§ 371 (c)(1),
(2) Date: Nov. 9, 2023

(87) PCT Pub. No.: WO2023/286537
PCT Pub. Date: Jan. 19, 2023

(65) Prior Publication Data
US 2024/0241273 A1    Jul. 18, 2024

(30) Foreign Application Priority Data
Jul. 16, 2021 (JP) ................................. 2021-117689

(51) Int. Cl.
*G01T 1/20* (2006.01)
*G01T 1/208* (2006.01)
(Continued)

(52) U.S. Cl.
CPC ............ *G01T 1/208* (2013.01); *H01J 49/025* (2013.01); *H01J 49/26* (2013.01)

(58) Field of Classification Search
CPC ......... G01T 1/20; G01T 1/2006; G01T 1/208; H01J 49/02; H01J 49/022; H01J 49/025;
(Continued)

(56) References Cited

U.S. PATENT DOCUMENTS

| 4,785,183 A * | 11/1988 | Tsuchino | ........... H04N 1/40056 |
| | | | 250/585 |
| 7,772,550 B2 * | 8/2010 | Schaefer | ............... H01J 49/424 |
| | | | 250/281 |

(Continued)

FOREIGN PATENT DOCUMENTS

JP     2008-145213 A     6/2008

OTHER PUBLICATIONS

International Search Report of PCT/JP2022/024621 dated Jul. 26, 2022.

*Primary Examiner* — John R Lee
(74) *Attorney, Agent, or Firm* — MATTINGLY & MALUR, PC (57) ABSTRACT

A signal detection device including: detection equipment including a photoelectric conversion element configured to convert a photon as a detection target into a current signal, and a current-voltage converter configured to convert the current signal into a voltage signal; a transmission unit configured to transmit the voltage signal; and a data collection unit configured to detect and collect the transmitted voltage signal. Here, the detection equipment is disposed inside a first shield case connected to a frame ground. The current-voltage converter includes a differential amplifier having first and second input terminals, the first input terminal is connected to a first output terminal of the photoelectric conversion element via a first input resistor, the second input terminal is connected to a second output terminal of the photoelectric conversion element and a (Continued)

ground via a second input resistor having a resistance value larger than that of the first input resistor.

14 Claims, 8 Drawing Sheets

(51) Int. Cl.
  *H01J 49/02* (2006.01)
  *H01J 49/26* (2006.01)
(58) Field of Classification Search
  CPC .. H01J 49/22; H01J 49/26; H01J 49/28; H01J 49/34
  See application file for complete search history.

(56) References Cited

U.S. PATENT DOCUMENTS

| | | | | |
|---|---|---|---|---|
| 9,099,286 | B2* | 8/2015 | Brown | H01J 49/0031 |
| 10,204,775 | B2* | 2/2019 | Brown | H01J 49/0095 |
| 10,867,781 | B2* | 12/2020 | Ramsey | H01J 49/0031 |
| 11,728,154 | B2* | 8/2023 | Komander | H01J 49/26 |
| | | | | 250/281 |
| 11,781,907 | B2* | 10/2023 | Capella | G01J 1/0271 |
| | | | | 600/310 |
| 2014/0183355 | A1* | 7/2014 | Bartfay-Szabo | H01J 49/24 |
| | | | | 250/290 |

\* cited by examiner

SIGNAL DETECTION DEVICE, MEASUREMENT DEVICE, AND MASS SPECTROMETER

TECHNICAL FIELD

The present disclosure relates to a signal detection device, a measurement device, and a mass spectrometer.

BACKGROUND ART

For example, a signal detection device is used, the signal detection device including a scintillator that emits scintillation light when a B-ray enters a B-ray measurement device, a wavelength conversion fiber that absorbs the scintillation light and converts the scintillation light into scintillation light having a different wavelength, and a photomultiplier tube that captures the light propagated by the wavelength conversion fiber.

Further, for example, in a mass spectrometer, the signal detection device is used in which after a sample to be analyzed is vaporized, the sample to be analyzed is ionized by applying a high electric field, the ionized sample is caused to collide with a conversion dynode to generate secondary electrons, the secondary electrons enter the scintillator to generate the scintillation light, and the scintillation light is captured by the photomultiplier tube.

Regarding such a signal detection device, for example, PTL 1 discloses a signal detection device including a substantially-flat-plate shaped first B-ray detector 2 including a scintillator and a wavelength conversion fiber, a substantially-flat-plate shaped second B-ray detector 3 provided so as to overlap the first B-ray detector 2 in a thickness direction and including a scintillator and a wavelength conversion fiber, and a B-ray shield plate 4 provided between the first B-ray detector 2 and the second B-ray detector 3 and configured to shield the B-ray, in which the scintillator of the first B-ray detector 2 and the scintillator of the second B-ray detector 3 have the same shape, and the wavelength conversion fiber of the first B-ray detector 2 and the wavelength conversion fiber of the second B-ray detector 3 has the same configuration, so that the B-ray as a detection target and a y-ray that is noise are distinguished, and the noise at an environmental temperature while ensuring S/N is reduced.

CITATION LIST

Patent Literature

PTL 1: JP2008-145213A

SUMMARY OF INVENTION

Technical Problem

However, the noise that degrades S/N of a signal detection device including a photoelectric conversion element, a signal detector, and a data collection unit includes, in addition to a detection signal other than a detection target in a sensor such as a scintillator and thermal noise when the signal detection device is in an environmental temperature, electromagnetic wave noise (hereinafter referred to as "disturbance propagation noise") generated from another electrical device inside a measurement device or disturbance propagation noise entering from the outside of the measurement device when the signal detection device is mounted on the measurement device. Examples of the electrical device in the measurement device that generates the disturbance propagation noise include a switching power supply and a digital circuit. Examples of the disturbance propagation noise entering from the outside of the measurement device include other measurement device disposed close to the measurement device, communication radio waves, and broadcast radio waves. Here, in general, in a measurement device having high detection accuracy, a weaker signal is detected by increasing sensitivity of the photoelectric conversion element such as the photomultiplier tube used in the signal detection device to be mounted.

However, when the sensitivity of the photoelectric conversion element is increased, disturbance propagation noise generated inside and outside the signal detection device is also detected as a signal with high sensitivity, which causes a problem that normal measurement cannot be performed. In view of such circumstances, the disclosure proposes a technique for reducing an influence of the disturbance propagation noise inside and outside the signal detection device and improving signal detection accuracy.

Solution to Problem

In order to solve the above problem, the present disclosure provides a signal detection device including: detection equipment including a photoelectric conversion element configured to convert a photon as a detection target into a current signal, and a current-voltage converter configured to convert the current signal into a voltage signal; a transmission unit configured to transmit the voltage signal; and a data collection unit configured to detect and collect the transmitted voltage signal, in which the detection equipment is disposed inside a first shield case connected to a frame ground, and the current-voltage converter includes a differential amplifier having first and second input terminals, the first input terminal is connected to a first output terminal of the photoelectric conversion element via a first input resistor, the second input terminal is connected to a second output terminal of the photoelectric conversion element and a ground via a second input resistor having a resistance value larger than that of the first input resistor, first and second output terminals of the current-voltage converter are connected to the data collection unit by the cable transmission unit, and the cable transmission unit is connected to the ground together with the current-voltage converter and the data collection unit.

Additional features related to the disclosure will become apparent from the description of the present specification and the accompanying drawings. Aspects of the disclosure may be achieved and implemented using elements, combinations of various elements, the following detailed description, and accompanying claims. Descriptions in this specification are merely exemplary, and are not intended to limit the scope of the claims or application of the disclosure in any sense.

Advantageous Effects of Invention

According to the technique of the disclosure, when the disturbance propagation noise enters the signal detection device, an influence of the disturbance propagation noise on signal detection can be reduced, and detection accuracy can be improved.

DESCRIPTION OF EMBODIMENTS

Hereinafter, embodiments of the disclosure will be described with reference to the accompanying drawings. In the accompanying drawings, functionally identical element may be displayed by the same number. The accompanying drawings show specific embodiments and implementation examples according to the principle of the disclosure, but these are for understanding the disclosure and are not used to interpret the disclosure in a limited manner. In addition, in the present embodiment, description of the same or similar parts will not be repeated in principle unless particularly necessary.

The present embodiment is described in sufficient detail in order for a person skilled in the art to implement the disclosure, but it should be understood that other implementations and aspects are possible, and changes in configuration and structure and replacement of various elements are possible without departing from the scope and spirit of the technical idea of the disclosure. Therefore, the following description is not to be construed as being limited thereto.

(1) First Embodiment

Hereinafter, a technique for reducing disturbance propagation noise superimposed on a signal output by a photoelectric conversion element in a signal detection device that includes detection equipment including the photoelectric conversion element, a current-voltage converter, and a shield case, a cable transmission unit, and a data collection unit will be described.

<Configuration Example of Signal Detection Device>

Figure 1:
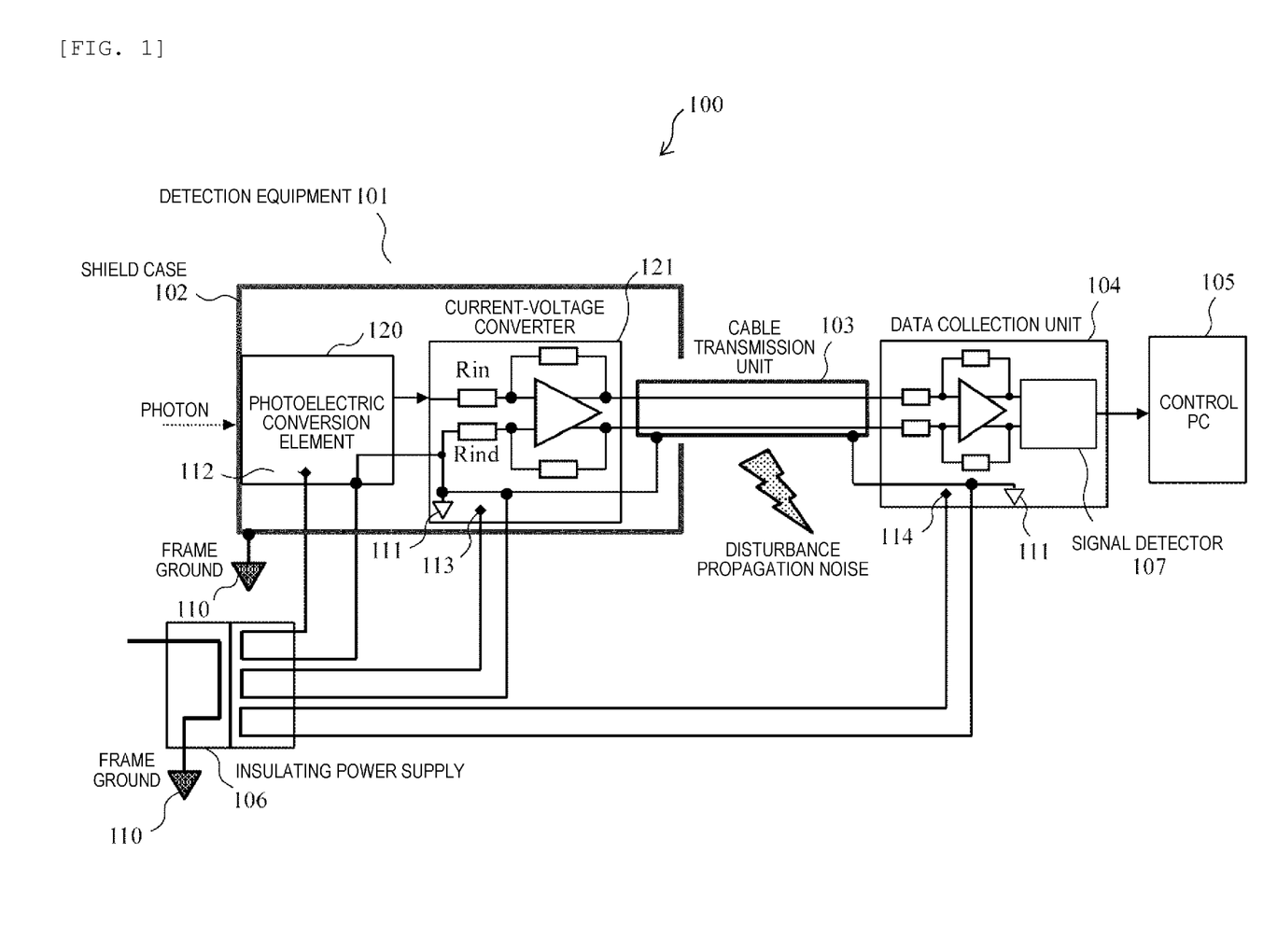
FIG. 1 is a diagram showing a configuration example of a signal detection device 100 according to a first embodiment.

FIG. 1 is a diagram showing a configuration example of a signal detection device 100 according to a first embodiment. The signal detection device 100 includes a photoelectric conversion element 120 that converts a photon as a detection target into a current signal, a current-voltage converter 121 that converts the current signal output from the photoelectric conversion element 120 into a voltage signal, a cable transmission unit 103 that transmits the voltage signal output from the current-voltage converter 121, a data collection unit 104 that detects and collects the transmitted voltage signal, a control device (computer) 105, a shield case 102 that accommodates the photoelectric conversion element and the current-voltage converter, and an insulating power supply 106 that supplies power to the photoelectric conversion element, the current-voltage converter, and the data collection unit.

The photon as the detection target includes, for example, scintillation light output from a scintillator, and reflected light from an optical measuring device using a laser, or the like.

The photoelectric conversion element 120 is a sensor that outputs a current amount corresponding to an amount of entering photons, and for example, a photomultiplier tube, a photodiode, or the like can be used.

The current-voltage converter 121 is a transformer-impedance circuit that outputs a voltage amount corresponding to an input current amount, and includes first and second differential input terminals and first and second differential output terminals.

The cable transmission unit 103 is a transmission path that transmits a differential voltage signal output from the current-voltage converter 121 as an analog signal to the data collection unit 104, and for example, a coaxial cable that has a shielding effect by covering a signal line with an insulating layer and a conductive layer can be used. Further, the cable transmission unit 103 may be a differential coaxial cable that differentially transmits the differential voltage signals of the current-voltage converter 121 as a pair, or may be connected to the data collection unit 104 by two coaxial cables separately for each of the first and second output terminals.

The data collection unit 104 includes a signal detector 107 that detects the differential voltage signal transmitted by the cable transmission unit 103. In order to improve detection accuracy of the signal detector 107, an amplifier, a filter for selecting a detection band, and the like may be provided in front of the signal detector 107. The signal detector 107 has a function of detecting and collecting the differential voltage signal and transferring the signal to the control device 105. The signal detector 107 includes, for example, an analog-digital converter, a memory, and a data transferring unit, samples and quantizes the differential voltage signal by the analog-digital converter to generate digital data, and temporarily stores the digital data in the memory. When a certain amount of data is stored in the memory, the data transferring unit transfers the digital data to the control device 105. Further, for example, the signal detector 107 may include a comparator, a threshold voltage generator, and the data transferring unit. The comparator may compare the voltage signal and a threshold voltage, when the voltage signal exceeds the threshold voltage, "1" may be transferred to the control device 105 as a digital value, and when the voltage signal does not exceed the threshold voltage, "0" may be transferred to the control device 105 as the digital value.

The insulating power supply 106 is a power supply that insulates the photoelectric conversion element 120, the current-voltage converter 121, and the data collection unit 104 from a measurement device frame ground 110 and supplies necessary power to the photoelectric conversion element 120, the current-voltage converter 121, and the data collection unit 104, and for example, the insulating power supply 106 is an insulated power supply that can electrically insulate a primary side and a secondary side.

The control device 105 controls operations of the data collection unit 104 while processing the detected and collected data. The control device 105 also controls the measurement device. For example, when the measurement device is a mass spectrometer, the control device 105 controls a voltage value to be applied to an ion source 701, a converging unit 702, a separator 703, and a fluorescent unit 704 (see following FIG. 8) of the mass spectrometer.

<Inflow Path of Disturbance Propagation Noise>

Figure 2:
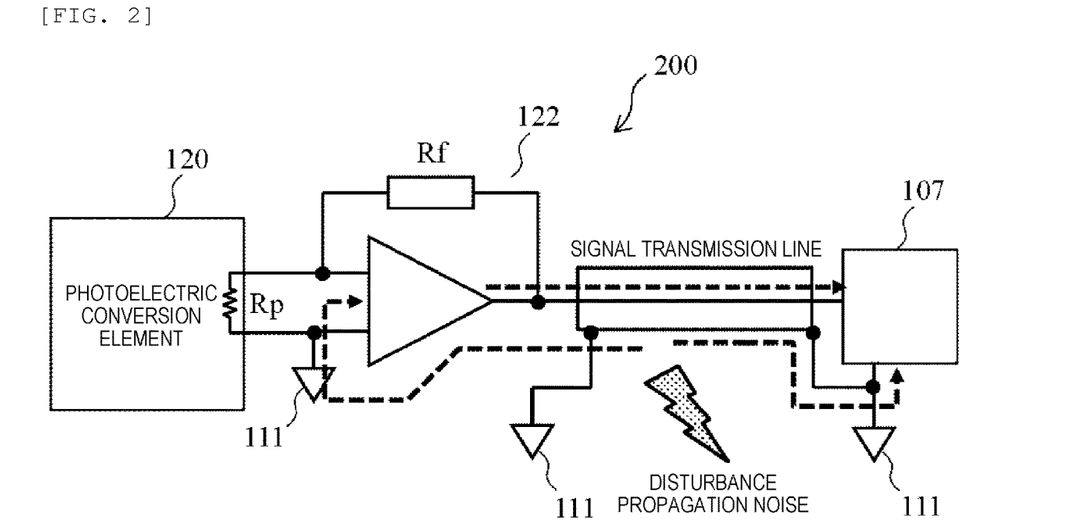
FIG. 2 is a diagram showing a configuration example of an electric circuit of a signal detection device according to the related art.

FIG. 2 is a diagram showing a configuration example of an electric circuit of a signal detection device 200 according to the related art.

First, a detection principle of the signal detection device 200 according to the related art will be described. A current signal output from the photoelectric conversion element 120 is converted into a voltage signal by a current-voltage converter 122 having one output terminal. A magnification of general current-voltage conversion is feedback resistance Rf (voltage signal=current signal×Rf). The voltage signal is transmitted to the signal detector 107 through a signal transmission line such as a cable.

Next, a noise path when disturbance propagation noise enters the signal detection device 200 according to the related art will be described. In general, even in the related art, in order to prevent direct entrance of the disturbance propagation noise on wiring for transmitting signals, the entire signal detection device is subjected to a shield process. However, the disturbance propagation noise flows into an input terminal of the current-voltage converter 122 through a conductor used in the shield process. Accordingly, the current-voltage converter 122 transmits the disturbance propagation noise as the voltage signal to the signal detector 107. The disturbance propagation noise also flows into the signal detector 107 through a conductor used in the shield process on a transmission path such as a cable. As a result, S/N degradation of the signal detection is caused.

<Configuration Example for Reducing Disturbance Propagation Noise>

Figure 3:
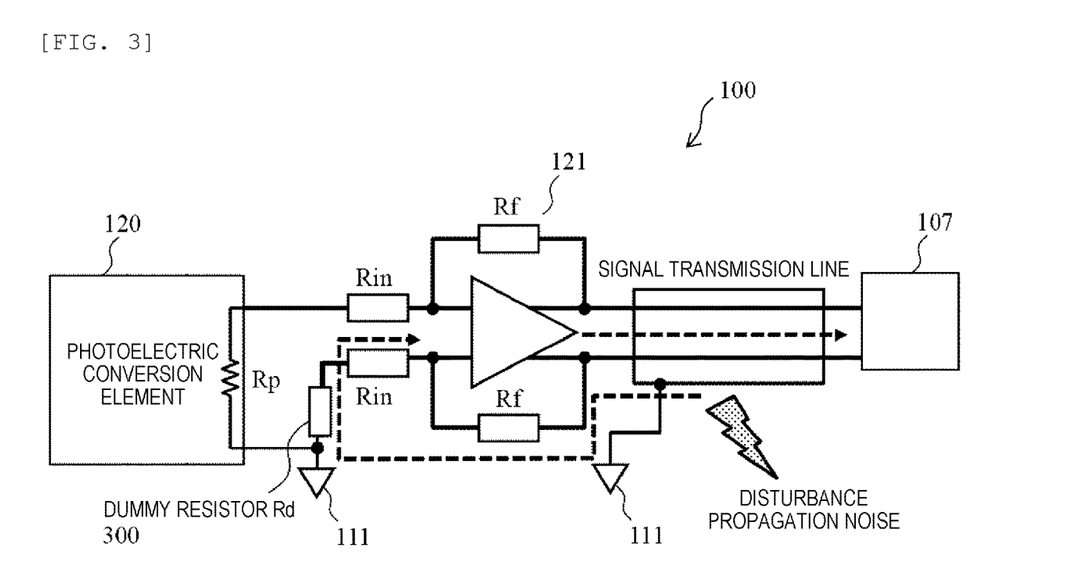
FIG. 3 is a diagram showing a configuration example of an electric circuit of the signal detection device 100 according to the first embodiment.

FIG. 3 is a diagram showing a configuration example of an electric circuit of the signal detection device 100 according to the first embodiment. As in the case of the above (FIG. 2), when the disturbance propagation noise is superimposed on the conductor for shielding the signal wiring, the disturbance propagation noise flows into the input terminal of the current-voltage converter 121 via a dummy resistor (also referred to as replica resistor: resistance value Rd) 300 in the first embodiment. Therefore, when the disturbance propagation noise is attenuated by the dummy resistor 300, it is considered that a voltage signal derived from the disturbance propagation noise output by the current-voltage converter 121 can be reduced. Further, by subtracting an output of the current-voltage converter 121, a path through which the disturbance propagation noise flows to the signal detector 107 can be cut off. Accordingly, S/N of the signal detection can be maintained.

Here, when a case of using a photomultiplier tube as the photoelectric conversion element 120 is an example, an attenuation amount of the disturbance propagation noise will be described. A general circuit equivalent model of the photomultiplier tube is parallel connection of an ideal current source and a resistor, and has a resistance value of about several MΩ to several tens of MΩ. When this resistance is Rp (shown in FIGS. 2 and 3), an amplification factor of the disturbance propagation noise in the signal detection device of the related art of FIG. 2 is 1+Rf/Rp. In general, since a value of Rf of several hundreds of Ω to several kΩ is used, a value of Rf/Rp can be approximated to zero. Accordingly, when the amplification factor of the disturbance propagation noise of the related art is 1+Rf/Rp≈1, the noise is output with the same intensity.

On the other hand, an amplification factor of the disturbance propagation noise in the signal detection device 100 according to the first embodiment shown in FIG. 3 is Rf/(Rin+Rd). The value of Rf of several hundreds of Ω to several kΩ and a value of Rin of several tens of Ω to several hundreds of Ω are used. Here, the value of Rd of the dummy resistor 300 of several kΩ to several tens of kΩ can be used. That is, the amplification factor of the disturbance propagation noise is Rf/(Rin+Rd) z Rf/Rd<1, and can be less than 1. As a result, the disturbance propagation noise is attenuated and output.

As described above, as the value of the dummy resistor Rd increases, the disturbance propagation noise can be further attenuated, resulting in an increase in thermal noise of the dummy resistor Rd itself and a decrease in a frequency band of the current-voltage converter. Therefore, the value of the dummy resistor Rd can be determined by balancing circuit characteristics (electrical characteristics) of the signal detection device 100 as described above and the attenuation amount of the disturbance propagation noise. The circuit characteristic is that the frequency band that can be detected by the signal detection device 100 is proportional to the value (Rd) of the dummy resistor 300. When the resistance value Rd is too large, only a signal having a low frequency can be detected. If the photomultiplier tube outputs a signal slowly, the value of Rd may be made extremely large, but this is only effective for a signal detection device having a slow signal output speed. Therefore, when a signal output frequency of the photomultiplier tube is high, Rd is not excessively increased, and an upper limit of Rd is several tens of kΩ.

In the above description, Rin and Rd are denoted as separate resistor elements, but one resistor element Rind having a total value of the resistance values of Rin and Rd may be used. In this case, resistance values of the first and second input terminals of the current-voltage converter have a relationship of Rin<Rind.

<Impedance Mismatch Caused by Dummy Resistor Insertion>

Referring to FIG. 1, an impedance mismatch and a countermeasure thereof when the signal detection device 100 according to the first embodiment is mounted on a measurement device will be described. In the signal detection device 100, as described above, the disturbance propagation noise is attenuated by using the dummy resistor, but an input impedance of the current-voltage converter is increased by the dummy resistor. This causes a mismatch between an impedance of wiring for transmitting the output signal of the photoelectric conversion element 120 and an input impedance of the current-voltage converter 121. Therefore, in order to accurately transmit the output signal of the photoelectric conversion element 120 to the current-voltage converter 121, it is necessary to dispose the photoelectric conversion element 120 and the current-voltage converter 121 close to each other and to shorten a wiring length. For example, the photoelectric conversion element 120 and the current-voltage converter 121 may be disposed close to each other within ¹⁄₁₀ of a wavelength of the output signal of the photoelectric conversion element 120.

Many of the photoelectric conversion elements 120 represented by the photomultiplier tubes have a high output impedance, and the current-voltage converter 121 also has a high input impedance. That is, the wiring for transmitting the output signal of the photoelectric conversion element 120 has a high impedance, and when the disturbance propagation noise directly enters this wiring, a large amount of noise is superimposed. Therefore, in order to prevent direct entrance of the disturbance propagation noise, it is necessary to accommodate the photoelectric conversion element 120 and the current-voltage converter 121 inside the shield case 102. That is, the shield case 102 shields the photoelectric conversion element 120 and the current-voltage converter 121 separately from a housing that shields the entire device. The shield case 102 can be made of a metal having low resistivity, and a material such as stainless steel or aluminum can be used.

<Ground Connection and Insulation>

Referring to FIG. 1, ground connection and insulation when the signal detection device 100 according to the first embodiment is mounted on the measurement device will be described. In order to accurately transmit the signal output from the photoelectric conversion element 120 to the data collection unit 104, grounds of the photoelectric conversion element 120, the current-voltage converter 121, the cable transmission unit 103, and the data collection unit 104 may be connected to a signal ground 111.

The shield case 102 is connected to the frame ground 110 in order to prevent the entering disturbance propagation noise from flowing into the photoelectric conversion element 120, the current-voltage converter 121, the cable transmission unit 103, and the data collection unit 104. The frame ground 110 and the signal ground 111 may be connected via a noise eliminator (not shown) such as a low pass filter.

Further, as described above, in order to separate the frame ground 110 and the signal ground 111 from each other, the insulating power supply 106 that can insulate the primary side and the secondary side can be used as a power supply that supplies power to the photoelectric conversion element 120, the current-voltage converter 121, the cable transmission unit 103, and the data collection unit 104.

A position of the noise eliminator (not shown) connecting the frame ground 110 and the signal ground 111 may be at the signal detector 107 or a form of connecting the primary side and the secondary side of the insulating power supply 106 in accordance with a shape of the measurement device to be mounted and a noise path.

Technical Effects of First Embodiment

As described above, even when the disturbance propagation noise enters the signal detection device 100 and/or the measurement device (for example, mass spectrometer), the disturbance propagation noise can be attenuated, and an influence on the measurement can be reduced to improve the signal detection accuracy.

(2) Second Embodiment

In the first embodiment described above, the coaxial cable is used for the cable transmission unit 103, and the signal of the photoelectric conversion element 120 is transmitted to the data collection unit 104 in the analog signal manner. In a second embodiment, a configuration in which a digital signal and an optical signal are used in the cable transmission unit 103 in the signal detection device 100 described in the first embodiment will be described.

<Configuration Example of Signal Detection Device>

Figure 4:
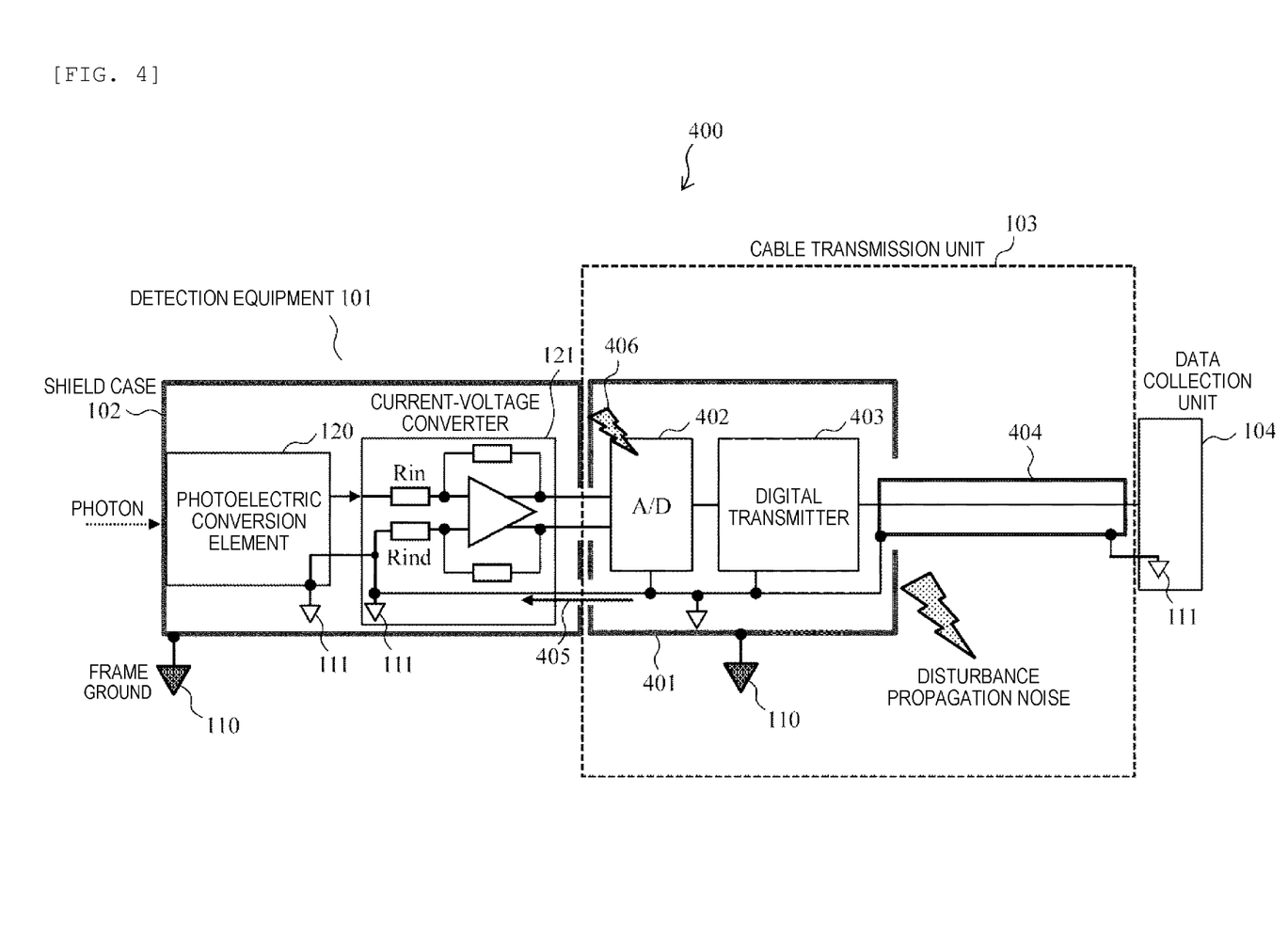
FIG. 4 is a diagram showing a configuration example of a signal detection device 400 according to a second embodiment.

FIG. 4 is a diagram showing a configuration example of a signal detection device 400 according to the second embodiment. An operation principle of the signal detection device using the digital signal will be described with reference to FIG. 4.

In the signal detection device 400, the cable transmission unit 103 includes an analog-digital converter 402 that samples and quantizes the voltage signal that is an analog signal output by the current-voltage converter 121 and converts the voltage signal into a digital value, a digital transmitter 403 that transmits the voltage signal converted into the digital value, and a digital transmission path 404 that transmits the digital signal.

As the analog-digital converter 402, for example, a general A/D converter can be used. Alternatively, the analog-digital converter 402 may include a threshold voltage generator and a comparator. The comparator may compare the voltage signal output by the current-voltage converter 121 with a threshold output from the threshold voltage generator, when the voltage signal exceeds the threshold voltage, the voltage signal may be converted into a digital value of "1" and output, and when the voltage signal does not exceed the threshold voltage, the voltage signal may be converted into a digital value of "0" and output.

The digital transmitter 403 performs a digital data transmission process such as encoding, synchronization, and modulation as necessary on the voltage signal converted into a digital value. For example, a general standard transmission scheme such as Ethernet may be used. When the digital data transmission process is unnecessary, the digital transmitter 403 may output the digital signal output by the analog-digital converter 402 to the digital transmission path 404 as it is.

As described above, when a digital circuit referred to as the analog-digital converter 402 or the digital transmitter 403 is connected to a subsequent stage of the current-voltage converter 121, noise generated from the digital circuit flows into the current-voltage converter 121 to cause the S/N degradation of the signal detection. The noise generated from the digital circuit includes propagation noise 406 radiated by a digital operation and conduction noise (ground noise) 405 conducted from a ground of the digital circuit.

In order to prevent the propagation noise 406 radiated by the digital operation, the analog-digital converter 402 and the digital transmitter 403 are disposed outside the shield case 102. The conduction noise (ground noise) 405 from the ground can be attenuated by the dummy resistor Rd or the resistor element Rind having the total value of the dummy resistor Rd and the input resistor Rin described in the first embodiment. The conduction noise (ground noise) 405 generated by the disturbance propagation noise entering the analog-digital converter 402, the digital transmitter 403, and the digital transmission path 404 can also be attenuated by the resistor element Rind in the above manner.

In order to prevent the disturbance propagation noise from entering the analog-digital converter 402 and the digital transmitter 403, a shield case (shield case for a digital transmission unit) 401 may be disposed separately from the shield case 102.

Effects of Second Embodiment

According to the second embodiment, the disturbance propagation noise can be attenuated when the disturbance propagation noise enters the signal detection device 400 using the digital signal, so that an influence on the measurement can be reduced to improve the accuracy.

(3) Third Embodiment

<Configuration Example of Signal Detection Device>

Figure 5:
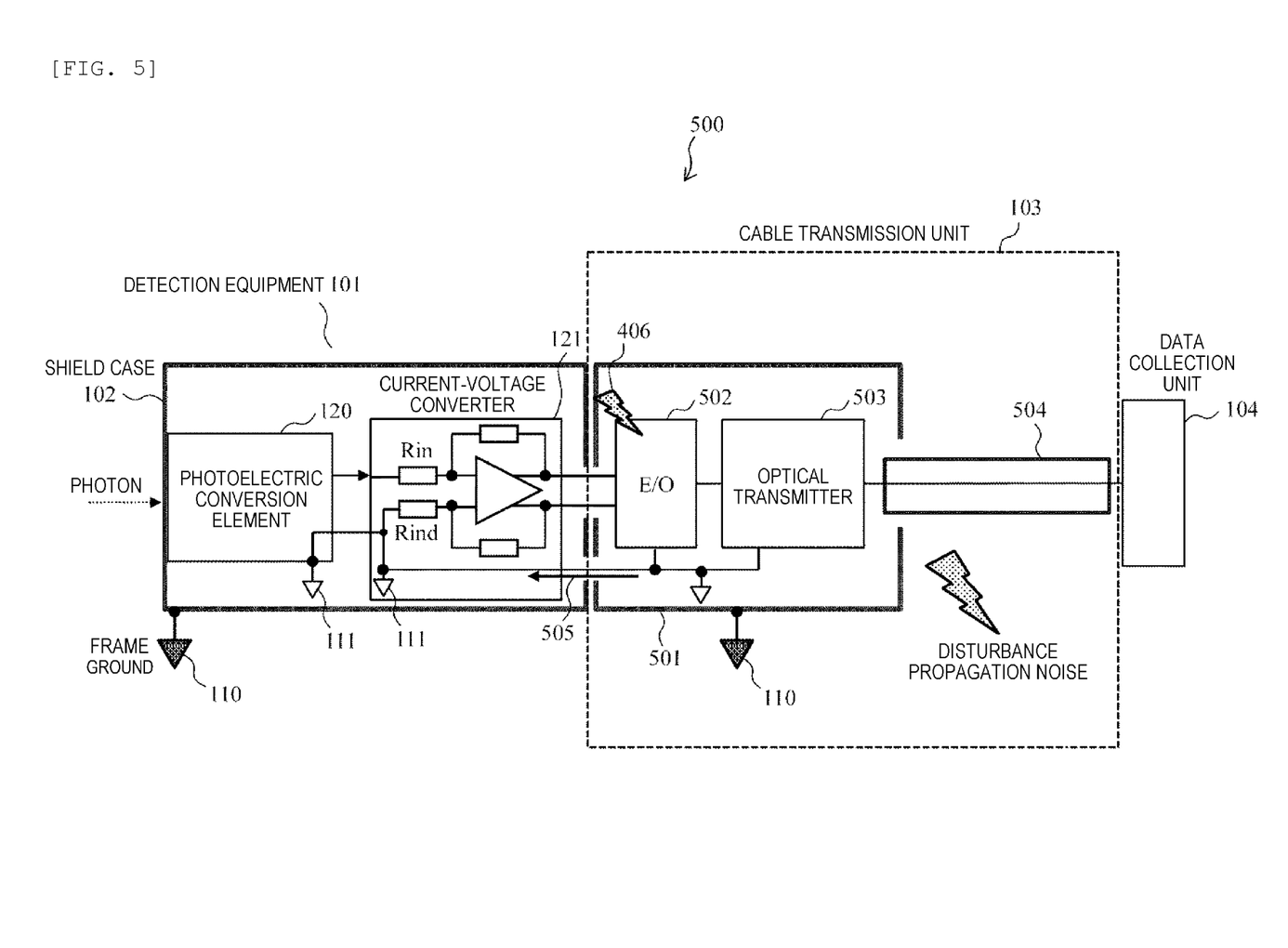
FIG. 5 is a diagram showing a configuration example of a signal detection device 500 according to a third embodiment.

FIG. 5 is a diagram showing a configuration example of a signal detection device 500 according to a third embodiment. The third embodiment relates to signal detection using an optical signal. The signal detection device 500 has the same configuration as the signal detection device 400 according to the second embodiment, except for the configuration of the cable transmission unit 103.

The cable transmission unit 103 included in the signal detection device 500 includes an electric-optical converter 502, an optical transmitter 503, and an optical transmission path 504.

The electric-optical converter 502 converts the voltage signal output from the current-voltage converter 121 into an optical signal. The optical transmitter 503 outputs the optical signal converted by the electric-optical converter 502 to the optical transmission path 504. The electric-optical converter 502, the optical transmitter 503, and the optical transmission path 504 may use, for example, digital optical communication using a general optical fiber. When a transmission distance of the cable transmission unit 103 is shortened by disposing the detection equipment 101 and the data collection unit 104 close to each other, analog optical communication using a photo coupler or the like may be used for the optical transmitter.

As in the signal detection device 400 (second embodiment) using the digital signal, in order to prevent the propagation noise 406 generated from the electric-optical converter 502 and the optical transmitter 503, the electric-optical converter 502 and the optical transmitter 503 are disposed outside the shield case 102. Conduction noise (ground noise) 505 from the ground can be attenuated by the dummy resistor Rd or the resistor element Rind having the total value of the input resistor Rin of the dummy resistor Rd described in the first embodiment. Further, the conduction noise 505 generated when the disturbance propagation noise entering the electric-optical converter 502 and the optical transmitter 503 can also be attenuated by the above-described resistor element Rind.

In order to prevent the disturbance propagation noise from entering the electric-optical converter 502 and the optical transmitter 503, the electric-optical converter 502 and the optical transmitter 503 may be disposed in a shield case (shield case for an optical transmission unit) 501 that is separate from the shield case 102.

Effects of Third Embodiment

According to the third embodiment, the disturbance propagation noise can be attenuated when the disturbance propagation noise enters the signal detection device 500 using the optical signal, so that an influence on the measurement can be reduced to improve the accuracy.

(4) Fourth Embodiment

The fourth embodiment will be described with reference to an arrangement of a signal detection device that improves the S/N of the signal detection by reducing an intensity of disturbance propagation noise itself that enters the signal detection device in a measurement device on which the signal detection device 100, 400, or 500 according to the first to third embodiments is mounted.

<Arrangement of Signal Detection Device in Measurement Device>

Figure 6:
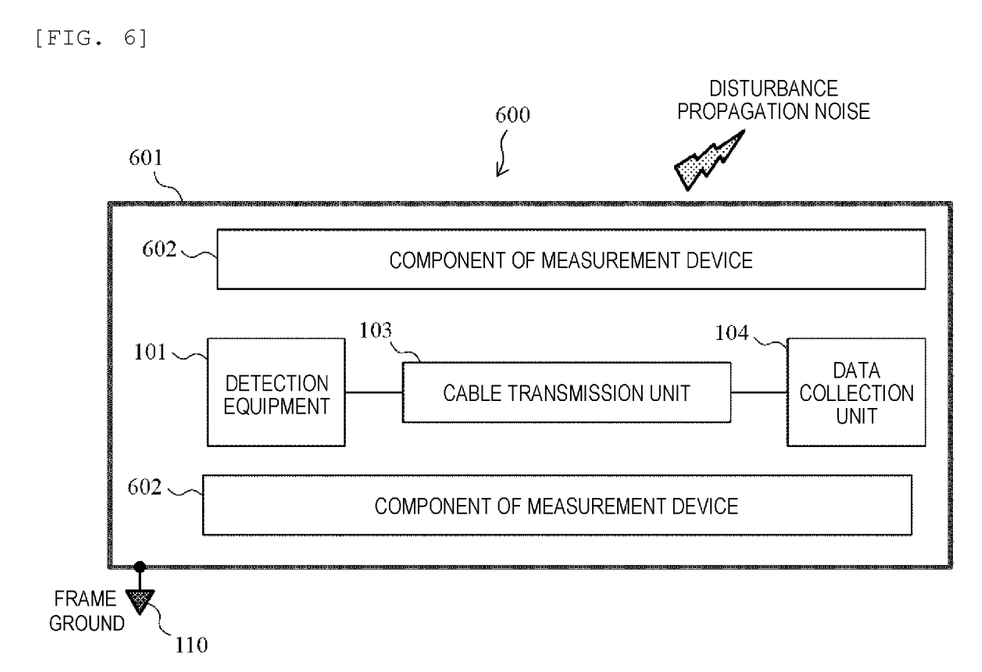
FIG. 6 is a diagram showing an arrangement position (example) of the signal detection devices 100, 400, or 500 in a measurement device 600 according to a fourth embodiment.

FIG. 6 is a diagram showing an arrangement position (example) of the signal detection device 100, 400, or 500 in a measurement device 600 according to the fourth embodiment. The measurement device 600 includes components 602 of the measurement device 600 inside a measurement device housing 601, and the signal detection device including the detection equipment 101, the cable transmission unit 103, and the data collection unit 104. The component 602 of the measurement device 600 is, for example, a device that performs processes for detecting an object to be measured, a power source of the measurement device, or the like.

The measurement device housing 601 is used as the frame ground 110. The frame ground 110 may be grounded (connected to earth).

In addition, an insulator may be disposed between the signal detection device 100, 400, or 500 and the component 602 of the measurement device, and may be disposed close to one another.

<Arrangement of Cable Transmission Unit>

Next, an arrangement of the cable transmission unit 103 will be described. The disturbance propagation noise entering the measurement device 600 is attenuated in intensity by the measurement device housing 601, but generally enters an inside of the measurement device 600. Therefore, the disturbance propagation noise entering the inside of the measurement device 600 enters the cable transmission unit 103 to cause the S/N degradation of the signal detection. Therefore, the cable transmission unit 103 is disposed at a position distant from the measurement device housing 601, and the disturbance propagation noise entering the measurement device 600 is further attenuated in intensity and enters the cable transmission unit 103. In particular, the cable transmission unit 103 constituting the signal detection device is disposed at a center portion of the measurement device 600, and the disturbance propagation noise can be further attenuated in intensity by the component 602 of the measurement device. This can be implemented by disposing the insulator at the center portion of the measurement device 600 on a bottom surface, for example, on the component 602 and disposing the signal detection device 100, 400, or 500 on the insulator.

Effects of Fourth Embodiment

According to the fourth embodiment, it is possible to reduce the intensity of the disturbance propagation noise itself that enters the signal detection device 100, 400, or 500, and thus, an influence on the measurement performed by the measurement device 600 can be reduced to improve the measurement accuracy.

(5) Fifth Embodiment

A mass spectrometer 700 according to the fifth embodiment that includes the signal detection device 100, 400, or 500 according to the first to third embodiments and performs mass spectrometry with high accuracy by reducing the disturbance propagation noise will be described.

<Configuration Example of Mass Spectrometer>

Figure 7:
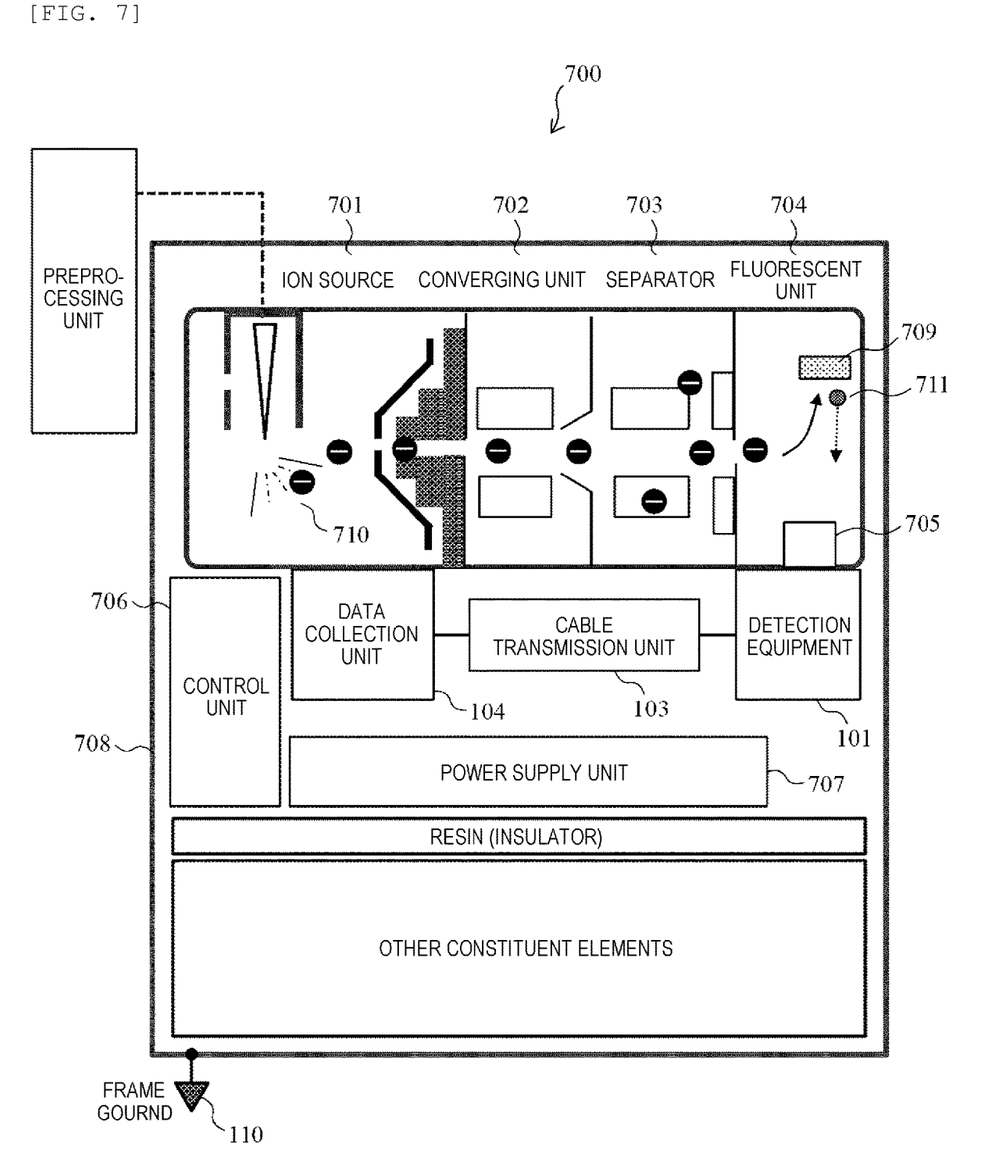
FIG. 7 is a diagram (a vertical cross-sectional view of a device side surface) showing a configuration example of a mass spectrometer 700 according to a fifth embodiment.
Figure 8:
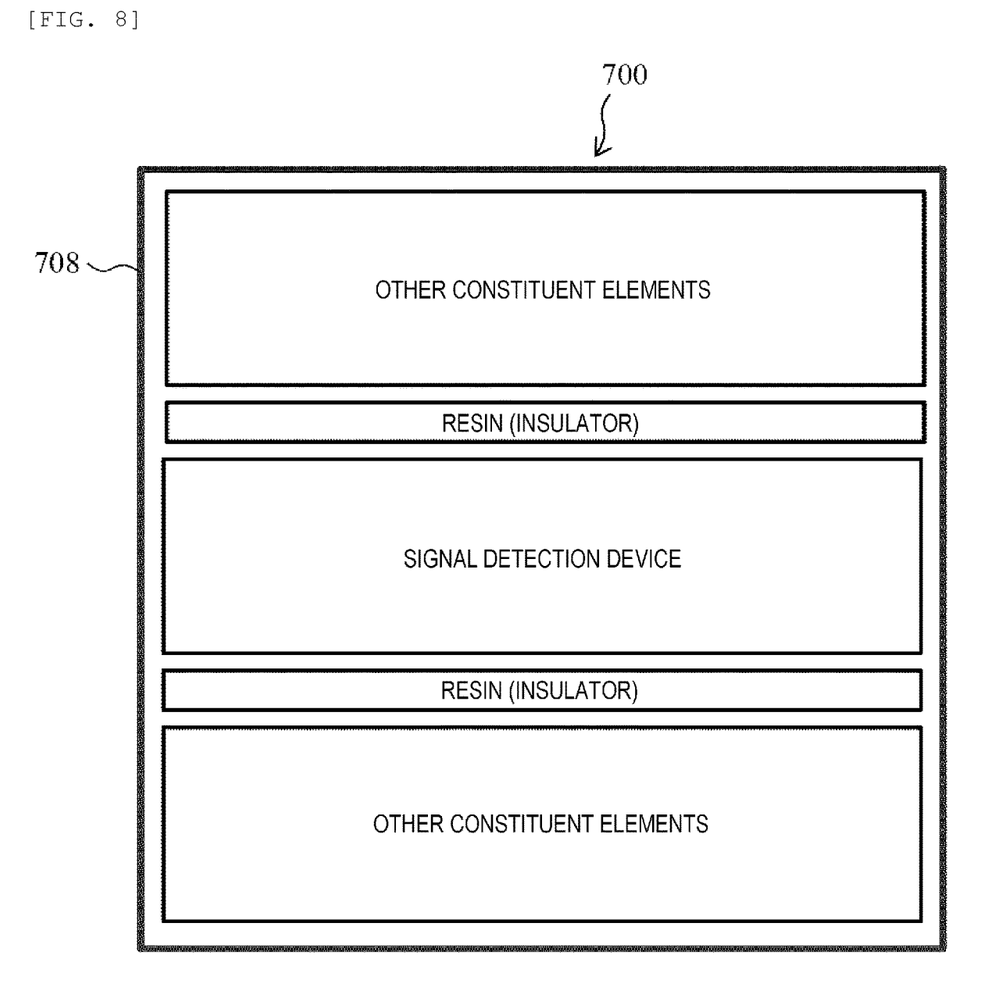
FIG. 8 is a horizontal sectional view of the mass spectrometer 700 viewed from above at a position where a signal detection device is disposed.

FIG. 7 is a diagram (a vertical cross-sectional view of a device side surface) showing a configuration example of the mass spectrometer 700 according to the fifth embodiment. FIG. 8 is a horizontal sectional view of the mass spectrometer 700 viewed from above at a position where the signal detection device is disposed.

The mass spectrometer 700 includes the ion source 701 that ionizes a sample to be analyzed, which is delivered from a preprocessing unit, the converging unit 702 that converges an ionized sample 710, the separator 703 that filters the converged and ionized sample according to a mass-to-charge ratio to allow only the ionized sample as a detection target to pass through, the fluorescent unit 704 that causes the ionized sample passed through the separator to collide with a conversion dynode 709, converts the sample into electrons according to an amount of the ionized sample, and outputs photons corresponding to an amount of the electrons by causing the electrons to enter a scintillator 705, the detection equipment 101 that outputs an electrical signal corresponding to the photons, the cable transmission unit 103 that transmits the electrical signal output from the detection equipment, the data collection unit 104 that detects and collects the electrical signal, a control unit 706 that controls mass spectrometry, a power supply unit 707 that supplies power to each unit, and a housing 708 that is a housing of the mass spectrometer.

The detection equipment 101, the cable transmission unit 103, and the data collection unit 104 are components included in the signal detection device 100, 400, or 500. The power supply unit 707 also includes the above-described insulating power supply 106. Further, the control unit 706 includes the above-described control device 105. An arrangement position of the signal detection device 100, 400, or 500 (in particular, the cable transmission unit 103) in the mass spectrometer 700 can be the center portion of the mass spectrometer 700 as described in the fourth embodiment (see FIGS. 7 and 8). As can be seen from FIGS. 7 and 8, the signal detection device 100, 400, or 500 is surrounded by a resin block, and is disposed at the center portion of the mass spectrometer 700. The signal detection device 100, 400, or 500 is placed on another component of the mass spectrometer 700, so that the signal detection device 100, 400, or 500 is disposed in the center portion in the vertical direction. As described above, the disturbance propagation noise is reduced by accommodating the signal detection devices 100, 400, or 500 in a housing (shield cases 102, 401, 501) that is separate from the housing 708 of the mass spectrometer 700.

<Examples of Measurement Result>

Figure 9:
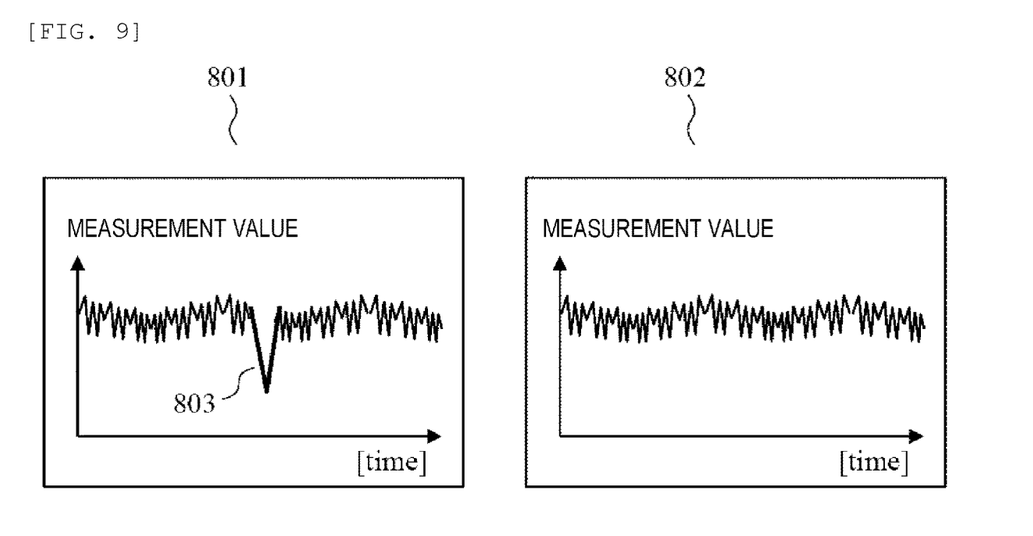
FIG. 9 is a diagram showing a measurement result example when disturbance propagation noise is irradiated during measurement of the mass spectrometer 700 according to the fifth embodiment and an S/N improvement effect example.

FIG. 9 is a diagram showing a measurement result example when the disturbance propagation noise is irradiated during the measurement of the mass spectrometer 700 according to the fifth embodiment and an S/N improvement effect example.

A measurement result 801 indicates a case where the disturbance propagation noise is superimposed on the detection signal and a measurement value variation 803 occurs. The measurement result 802 indicates a case where the S/N is improved by attenuating the disturbance propagation noise, and by preventing the occurrence of the measurement value variation 803, the mass spectrometry can be accurately performed.

Effects of Fifth Embodiment

According to the fifth embodiment, the mass spectrometry can be performed with high accuracy by reducing the disturbance propagation noise.

(6) Others

Although the technique of the disclosure has been specifically described above based on a plurality of embodiments, the technique of the disclosure is not limited to the embodiments, and can be variously modified without departing from the gist thereof. For example, the configurations of the first to fifth embodiments may be combined into a plurality of combinations and applied.

REFERENCE SIGNS LIST 100, 400, 500 signal detection device
101 detection equipment
102 shield case
103 cable transmission unit
104 data collection unit
105 control device
106 insulating power supply
107 signal detector
110 frame ground
111 signal ground
112 photoelectric conversion element power supply
113 current-voltage converter power supply
114 data collection unit power supply
120 photoelectric conversion element
121 current-voltage converter
300 dummy resistor
401 shield case for digital transmission unit
402 analog-digital converter
403 digital transmitter
404 digital transmission path
405, 505 conduction noise
406, 506 propagation noise
501 shield case for optical transmission unit
502 electric-optical converter
503 optical transmitter
504 optical transmission path
600 measurement device
601 measurement device housing
700 mass spectrometer
701 ion source
702 converging unit
703 separator
704 fluorescent unit
705 scintillator
706 control unit
707 power supply unit
709 conversion dynode

The invention claimed is:

1. A signal detection device comprising:
detection equipment including a photoelectric conversion element configured to convert a photon as a detection target into a current signal, and a current-voltage converter configured to convert the current signal into a voltage signal;
a transmission unit configured to transmit the voltage signal; and
a data collection unit configured to detect and collect the transmitted voltage signal, wherein
the detection equipment is disposed inside a first shield case connected to a frame ground, and the current-voltage converter includes a differential amplifier having first and second input terminals,
the first input terminal is connected to a first output terminal of the photoelectric conversion element via a first input resistor,
the second input terminal is connected to a second output terminal of the photoelectric conversion element and a ground via a second input resistor having a resistance value larger than that of the first input resistor, first and second output terminals of the current-voltage converter are connected to the data collection unit by the transmission unit, and the transmission unit is connected to the ground together with the current-voltage converter and the data collection unit.

2. The signal detection device according to claim 1, wherein the photoelectric conversion element, the current-voltage converter, and the data collection unit are insulated from the frame ground.

3. The signal detection device according to claim 1, wherein the photoelectric conversion element is a photomultiplier tube.

4. The signal detection device according to claim 1, wherein the second input resistor includes a resistor having a resistance value same as that of the first input resistor and connected to the second input terminal, and a dummy resistor having a resistance value larger than that of the first input resistor and connected to the photoelectric conversion element and the ground.

5. The signal detection device according to claim 1, wherein the photoelectric conversion element, the current-voltage converter, and the data collection unit are insulated from the frame ground by being supplied with power from an insulating power supply.

6. The signal detection device according to claim 1, wherein the frame ground is grounded.

7. The signal detection device according to claim 1, wherein the transmission unit transmits the voltage signal from the current-voltage converter to the data collection unit in an analog signal manner.

8. The signal detection device according to claim 1, wherein the transmission unit converts the voltage signal from the current-voltage converter into a digital signal and transmits the digital signal to the data collection unit.

9. The signal detection device according to claim 8, wherein the transmission unit is accommodated in a second shield case different from the first shield case.

10. The signal detection device according to claim 1, wherein the transmission unit converts the voltage signal from the current-voltage converter into an optical signal and transmits the optical signal to the data collection unit.

11. The signal detection device according to claim 10, wherein the transmission unit is accommodated in a second shield case different from the first shield case.

12. A measurement device comprising:

the signal detection device according to claim 1 in a measurement device housing, wherein at least the transmission unit included in the signal detection device is disposed at a center portion of the measurement device housing.

13. A mass spectrometer comprising:

in a housing, an ion source configured to ionize a sample to be analyzed;

a separator configured to allow only an ion of the ionized sample having a desired mass-to-charge ratio to pass through;

a conversion dynode configured to collide with the ion so as to emit a secondary electron;

a scintillator configured to allow the secondary electron to enter and emit scintillation light; and the signal detection device according to claim 1, configured to detect the light emitted from the scintillator and collect data.

14. The mass spectrometer according to claim 13, wherein the signal detection device is disposed at a center portion in the housing.

* * * * *